US012011725B1

(12) United States Patent

Rich, Jr.

(10) Patent No.: US 12,011,725 B1

(45) Date of Patent: Jun. 18, 2024

(54) PROCESS AND APPARATUS FOR SEPARATING ANTHRACITE OR BITUMINOUS FROM REFUSE

(71) Applicant: John W. Rich, Jr., Gilberton, PA (US)

(72) Inventor: John W. Rich, Jr., Gilberton, PA (US)

( * ) Notice: Subject to any disclaimer, the term of this patent is extended or adjusted under 35 U.S.C. 154(b) by 0 days.

(21) Appl. No.: 18/149,185

(22) Filed: Jan. 3, 2023

(51) Int. Cl.

| | |
|---|---|
| ***B03B 5/34*** | (2006.01) |
| ***B03B 5/44*** | (2006.01) |
| ***B03B 9/00*** | (2006.01) |
| ***B03B 9/06*** | (2006.01) |
| ***B03B 13/00*** | (2006.01) |

(52) U.S. Cl.

CPC ................ *B03B 5/34* (2013.01); *B03B 9/005* (2013.01); *B03B 9/061* (2013.01); *B03B 13/005* (2013.01); *B03B 5/447* (2013.01)

(58) Field of Classification Search

CPC ........... B03B 5/34; B03B 9/005; B03B 9/061; B03B 13/005; B03B 5/447

See application file for complete search history.

(56) References Cited

U.S. PATENT DOCUMENTS

| | | | | |
|---|---|---|---|---|
| 2,649,963 | A | | 8/1953 | Fontein |
| 2,701,641 | A | | 2/1955 | Krijgsman |
| 2,724,503 | A | | 11/1955 | Fontein |
| 2,726,763 | A | | 12/1955 | Rakowsky |
| 2,819,795 | A | | 1/1958 | Fontein et al. |
| 2,860,252 | A | | 11/1958 | Dijkstra |
| 3,031,074 | A | | 4/1962 | Osawa |
| 3,353,673 | A | | 11/1967 | Visman |
| 3,379,308 | A | | 4/1968 | Horiuchi |
| 3,887,456 | A | | 6/1975 | Loughner |
| 3,902,601 | A | | 9/1975 | Townley |
| 3,926,787 | A | | 12/1975 | Gay |
| 4,164,467 | A | | 8/1979 | Liller |
| 4,175,036 | A | | 11/1979 | Frykhult |
| 4,203,831 | A | | 5/1980 | Parnaby |
| 4,217,207 | A | * | 8/1980 | Liller ........................ B04C 5/02 209/13 |
| 4,226,708 | A | | 10/1980 | McCartney |
| 4,252,639 | A | | 2/1981 | Smith et al. |
| 4,364,822 | A | * | 12/1982 | Rich, Jr. ................... B04C 5/13 209/729 |

(Continued)

FOREIGN PATENT DOCUMENTS

GB 2212077 A * 7/1989 ........... B01D 21/267

*Primary Examiner* — Latosha Hines

(74) *Attorney, Agent, or Firm* — McHale & Slavin, P.A.

(57) ABSTRACT

A process for separating Anthracite and low quality carbon from refuse. Crushed refuse is admixed with water from a water storage source. The admixture is transferred to a first cyclone separator to divide the admixture into a refuse rich slurry stream and a carbonaceous rich slurry stream. The refuse rich slurry stream is dewatered through a vibrating screen and the water collected sent to the raw feed sump source. The carbonaceous rich slurry is directed to a second cyclone separator to separate low quality carbon from high quality carbon, the high quality carbon is transferred to a third cyclone separator used to separate the media water therefrom. The separated media water is returned via a siphon leg to the raw feed sump, and the dewatered high quality Anthracite is available for markets requiring higher quality carbon.

12 Claims, 3 Drawing Sheets

(56) References Cited

U.S. PATENT DOCUMENTS

| | | | | | |
|---|---|---|---|---|---|
| 4,795,037 | A | * | 1/1989 | Rich, Jr. | B03B 9/005 44/621 |
| 4,802,976 | A | | 2/1989 | Miller | |
| 4,830,741 | A | | 5/1989 | Ferencz et al. | |
| 4,865,740 | A | * | 9/1989 | Callut | B04C 5/26 209/729 |
| 5,108,608 | A | | 4/1992 | Carroll | |
| 5,189,964 | A | | 3/1993 | Rich, Jr. | |
| 5,277,368 | A | | 1/1994 | Kindig | |
| 6,015,104 | A | | 1/2000 | Rich, Jr. | |
| 6,170,770 | B1 | | 1/2001 | Rich, Jr. | |
| 6,711,903 | B1 | | 3/2004 | Rich, Jr. | |
| 6,869,979 | B1 | | 3/2005 | Rich, Jr. | |
| 7,988,754 | B1 | | 8/2011 | Rich, Jr. | |
| 10,399,123 | B2 | | 9/2019 | Ivanoff | |

* cited by examiner

PROCESS AND APPARATUS FOR SEPARATING ANTHRACITE OR BITUMINOUS FROM REFUSE

FIELD OF THE INVENTION

The present invention relates to the energy field and, more particularly, to a process and apparatus for separating Anthracite from refuse.

BACKGROUND OF THE INVENTION

Since the early 1800's, coal has been valued for its energy content, and substantial quantities of Anthracite was mined and processed to produce coal of various sizes. The coal was separated from mining refuse, and huge mounds of tailings were produced; mine tailings being the material left over after the process of separating the valuable energy rich ore. Tailings processed once or twice by previously known methods are presumed to be uneconomical to further process.

Known processes for separating coal from refuse is the use of a heavy media cyclone separator which relies on centrifugal forces in conjunction with a slurry to achieve separation. The slurry carries a specific gravity which is controlled by adding finely-pulverized magnetite ore to the tailings. The separator produces an overflow which is carbon-rich and an underflow which is rich in refuse. The carbon-rich overflow is dewatered and is rinsed with fresh water to produce a clean coal output and a magnetite-rich underflow slurry. The underflow slurry from the cyclonic separator is also dewatered and rinsed with fresh water to produce a refuse-rich reject material and a magnetite-rich underflow. The magnetite-rich underflow from both the coal-rich and refuse-rich dewatering screens is then passed through magnetic separators which separate the magnetite ore from its water carrier. While the prior art process is intended to prevent losses of magnetite, substantial losses of magnetite occur. Magnetite-enriched heavy medium cyclonic separation techniques are not economical. The magnetite-enriched heavy medium cyclonic separation process includes the requirement of a substantial amount of fresh water and a significant capital investment for the magnetic separators and the ongoing cost of magnetite.

A magnetite-enriched heavy medium cyclonic separation process is disclosed in U.S. Pat. No. 2,726,763. Coal separation processes which use other types of medium are disclosed in U.S. Pat. Nos. 2,701,641; 2,649,963; 2,860,252; 3,031,074; 2,819,795; 4,203,831; and 4,252,639. Separating cyclones are disclosed in one or more of the preceding patents and the following U.S. Pat. Nos. 2,724,503; 3,353,673; 4,164,467; 3,887,456; 4,175,036; 4,226,708; 3,379,308; and 3,902,601. Multiple stage cyclones are disclosed in one or more the following patents: U.S. Pat. Nos. 3,926,787; 4,802,976; 4,830,741; 4,865,740; 5,108,608; 5,277,368; and 10,399,123.

Applicant is the inventor named in U.S. Pat. No. 4,364,822, issued on Dec. 21, 1982, entitled "Autogenous Heavy Medium Process and Apparatus for Separating Coal from Refuse", the contents of which are incorporated herein by reference. The disclosure was directed to an autogenous non-magnetic heavy medium cyclonic separator in combination with ancillary equipment.

In the process, raw input from mine tailings was screened and mixed with a heavy medium to form an aqueous based slurry feedstock. The feed stock slurry flows through a primary cyclonic separator which causes a coal rich portion to exit its overflow and a refuse rich portion to exit its underflow. The underflow is screened and the fines are subsequently processed to yield carbonaceous matter. While the above referenced process and apparatus provided beneficial results, the process failed to recognize the ability to separate the coal refuse into channels of inert rock, low quality carbon, and high quality Anthracite.

What is needed is an economical process for refining coal mine tailings that is environmentally friendly.

SUMMARY OF THE INVENTION

Disclosed is a process and equipment for separating Anthracite from refuse. The process employs three cyclone separators staged to recover low and high quality carbon. The carbon rich overflow from a first cyclone separator reports to a second cyclone separator where the underflow is a low quality carbon and the overflow is high quality Anthracite. The carbon rich overflow reports to a third cyclone separator which separates the solids from the slurry. The water from the third cyclone separator is continuously circulated until the density reaches 1.35 or 1.45 (dirty H20) specific gravity, at which point fresh water is added and dirty water removed to a tailings pond, vacuum press, or a centrifuge to be clarified and reused. The process admixes coal refuse having an approximate size of less than ⅜"×0" with water from a water storage source into a feedstock slurry. The feedstock slurry is transferred to a first cyclone separator to divide the feedstock slurry into a refuse rich underflow stream and a carbonaceous rich overflow stream. The underflow stream is dewatered through a vibrating screen, and the collected water is recirculated to the main feed sump. The carbonaceous rich slurry is directed to a second cyclone separator to further separate low quality carbon from high quality carbon, the low quality carbon available for a market that uses the lower quality (i.e. Cogen Industry). The high quality Anthracite slurry is transferred to a third cyclone separator to separate solids from the slurry, the separated media is returned to the main feed sump, and the dewatered high quality Anthracite is available for markets requiring the higher quality carbon.

An objective of the invention is to recover high quality Anthracite from refuse in mine tailings, thought otherwise to be too expensive and difficult to recover.

Another objective of the invention is to teach a three stage refuse process, summarized as a first cyclone separator for rejecting the bulk of inert fireproof rock, a second cyclone separator for separating high quality carbon from low quality carbon, and a third cyclone separator to separate circulating media water from the high quality carbon.

It is another objective of the instant invention to provide an improved coal separation process that is environmentally friendly using recycled water.

Yet another object of the instant invention is to reduce the need for ancillary equipment and manpower to separate low quality carbon from high quality carbon.

Yet another objective of the invention is to teach a highly efficient process for the recovery of carbon.

Yet still another objective of the invention is to provide an inexpensive method for concentrating rare earth elements.

An advantage of the process is the minimum amount of energy necessary for operation because the separation is achieved at relatively low specific gravities and relatively low pressures.

Another advantage of the process is that no additives are required, and has a low operating cost.

Another advantage of the process is the minimal amount of equipment and make-up water required.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Figure 1:
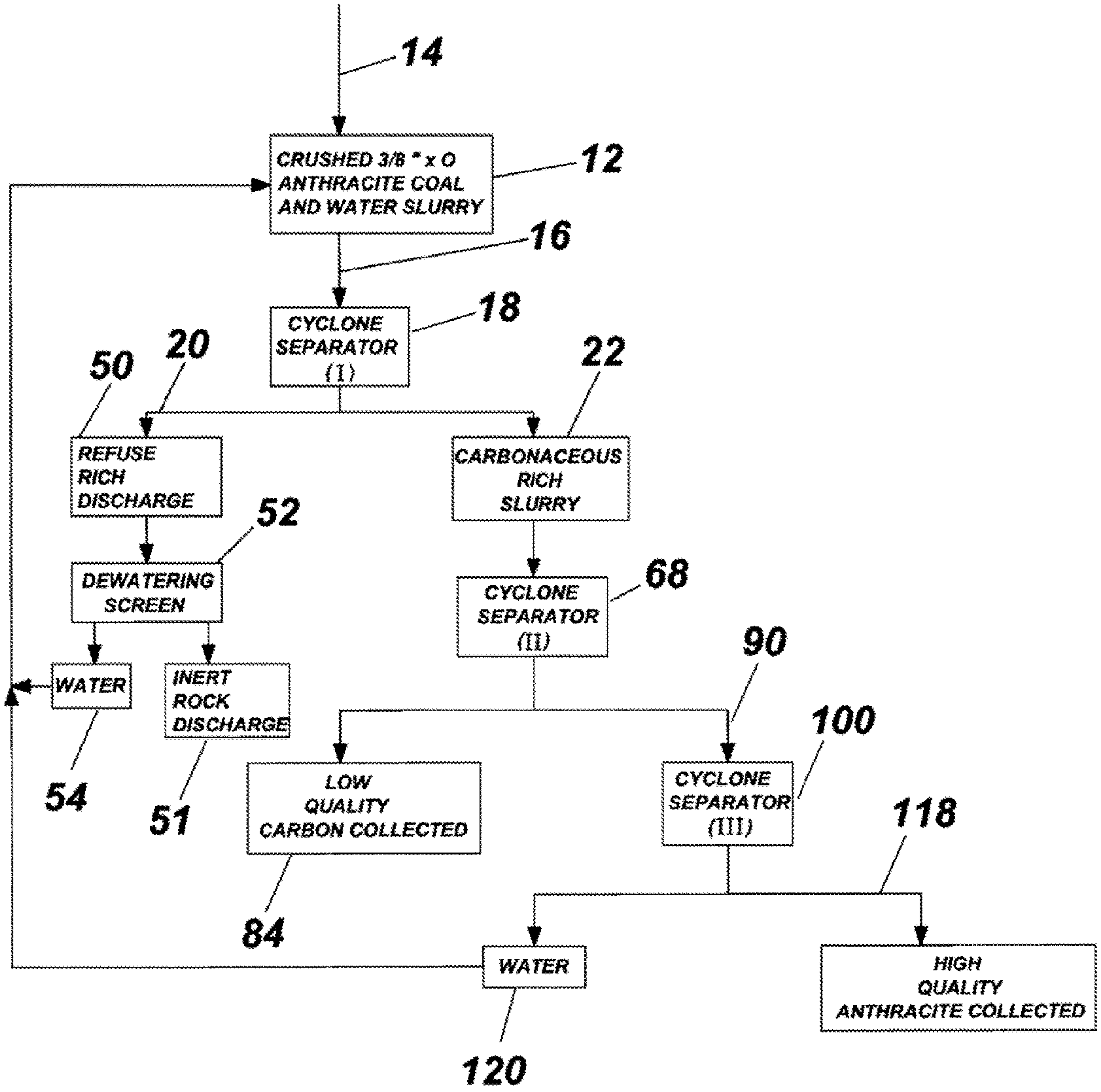
FIG. 1 is a flow chart depicting the staging of the three cyclone separators.
Figure 2:
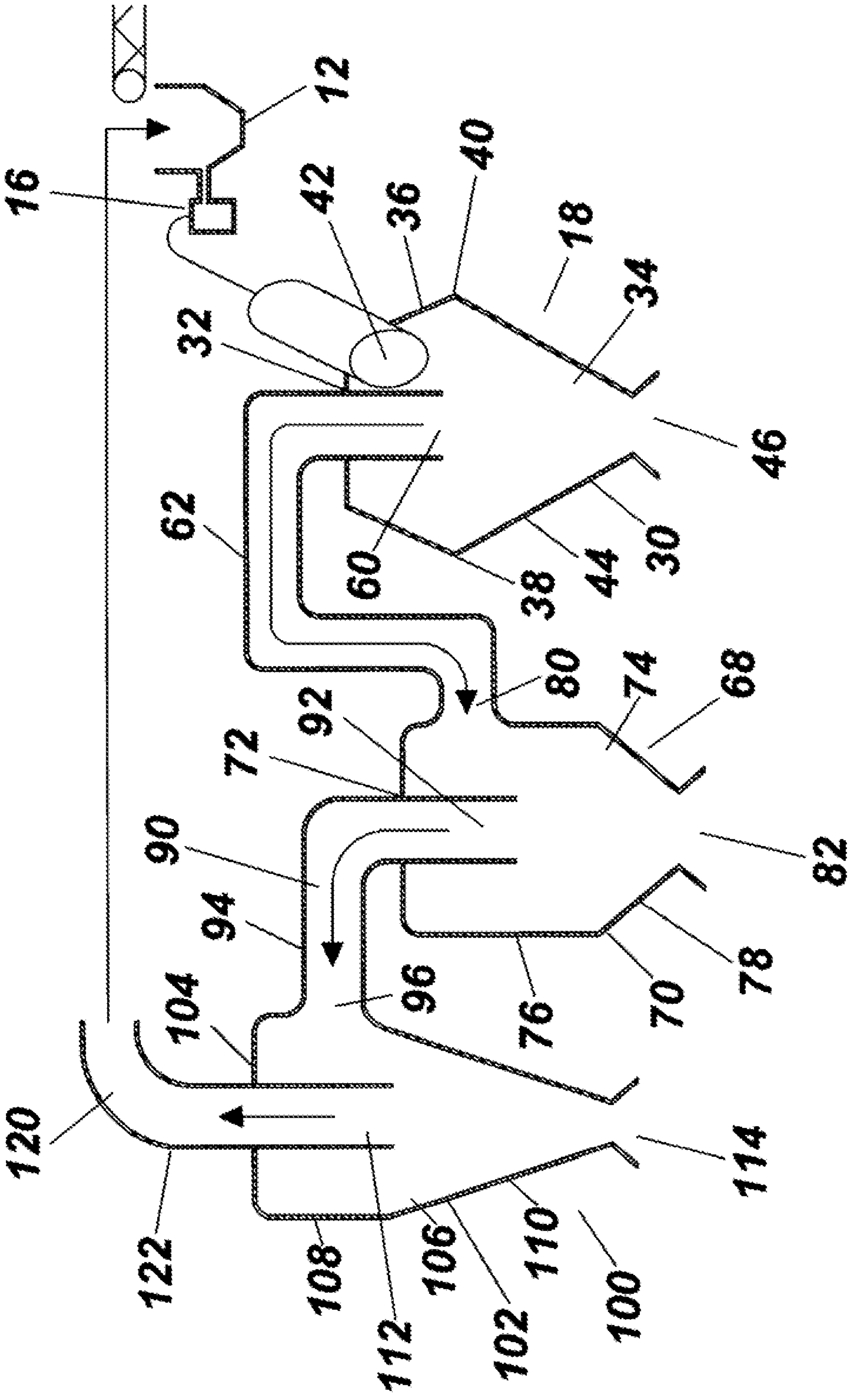
FIG. 2 is a frontal pictorial view of the three cyclone separators per the instant invention.
Figure 3:
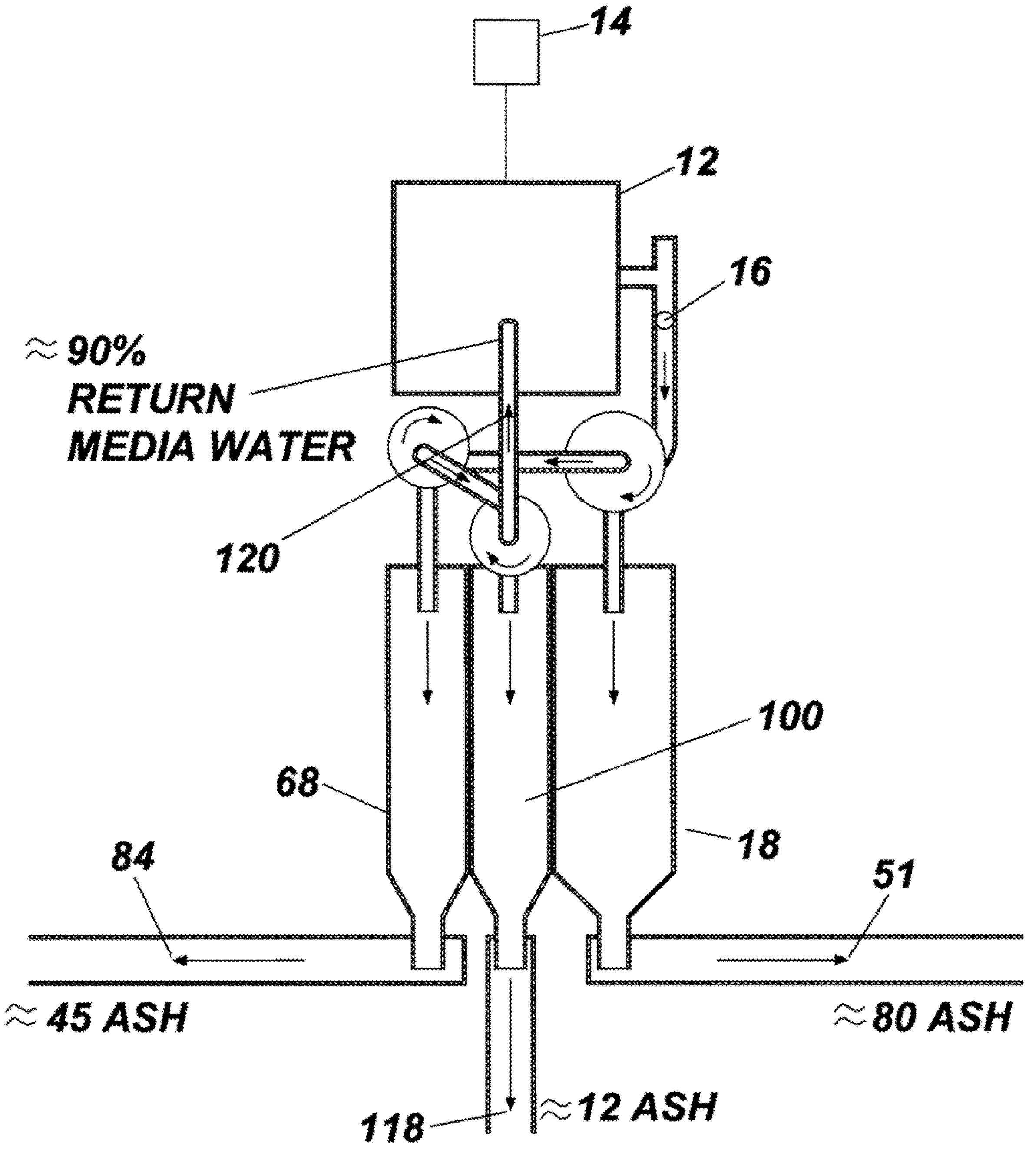
FIG. 3 is a side pictorial view thereof.

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

A typical pile of tailings comprises coal and refuse. For instance, a typical pile may comprise up to 20% by weight of coal with the balance being refuse. As used herein, the term coal is intended to mean Anthracite or Bituminous coal, and the term refuse is intended to mean a variety of inorganic matter such as rocks, shale, slate, clay, and the like, which is mined along with the coal. Referring to the figures in general, in the processes, refuse 10 which may comprise less than 20% coal by weight, is crushed and screened to an approximate size range of less than ⅜"×0", The crushed refuse is admixed with water 14 drawn from a water source forming an admixture 16. The admixture 16 is transferred into a first cyclone separator 18 constructed and arranged to divide the admixture 16 into a refuse rich slurry stream 20 and a carbonaceous rich slurry stream 22. Preferably, as further described herein, the cylindrical shaped cyclone separators have a continuous sidewall shaped to adjust acceleration/centrifugal force of the slurry stream. A first cyclone separator 18 has a continuous sidewall 30 depending from a top wall 32 forming a chamber 34 therein. An upper section 36 formed by the sidewall 30 expanding from a first diameter, as measured by the size of the top wall 32 expanding outwardly to a middle section 38 forming a second diameter 40, as measured along the widest portion of the sidewall 30. The admixture 16 is admitted through an inlet 42 formed tangentially in the sidewall 30, wherein acceleration is slowed and then rapidly increased upon entering a third section 44, wherein the sidewall 30 is formed into a conical shape diminishing in diameter from the middle section 38 to a first apex 46 to expel a refuse rich slurry 50 containing inert rock. The refuse rich slurry 50 is passed over a vibrating screen 52 for dewatering. Water 54 collected from the dewatering step is directed to the raw feed sump 12 for reuse, and the inert rock 51 with about 80% ash content is discharged. Because of the cylindrical shape, a substantial deceleration and acceleration is imparted to the solids as they circulate in the chamber at any given radius.

The carbonaceous rich slurry stream 22 is drawn from an outlet 60 through a transfer line 62 to a second cyclone separator 68. The second cyclone separator 68 has a continuous sidewall 70 depending from top wall 72 forming a chamber 74 therein. An upper section 76 is formed by the sidewall 70 depending from a first diameter, as measured by the size of the top wall 72, with a uniform diameter to a lower section 78. The admixture, being a carbonaceous rich slurry stream 22, is admitted through an inlet 80 formed tangentially in the sidewall 70, wherein acceleration maintained and then rapidly increased upon entering the lower section 78, wherein the sidewall 70 is formed into a conical shape, diminishing in diameter along the length of the lower section 78 to a second apex 82 for expelling a low quality carbon 84 with about 45% ash content. The high quality Anthracite slurry 90 is drawn from the vortex. The high quality carbon exits the second cyclone separator 68 through an intake 92 and transfer line 94. A cylindrical type of cyclone is to be contrasted with a tapered or variable acceleration type, wherein the shell has a depending frustoconical or tapered portion of substantial length and a relatively small included cone angle. Because of the conical shape, the acceleration forces increase on the particles as they circulate and advance.

The high quality Anthracite slurry stream 90 is drawn through the transfer line 94 to a third cyclone separator 100. The third cyclone separator 100 has a continuous sidewall 102 depending from a top wall 104 forming a chamber 106 therein. An upper section 108 is formed by the side all 102 depending along a first diameter, as measured by the size of the top wall 104 maintaining a uniform diameter to a lower section 110. The high quality Anthracite slurry 90 is admitted through an inlet 96 formed tangentially in the sidewall 102, wherein acceleration is maintained and then rapidly increased upon entering the lower section 110. The sidewall 102 is formed into a conical shape, diminishing in diameter along the length of the lower section 110 to a third apex 114 used for expelling dewatered high quality Anthracite 118 with about 12% ash content. The third cyclone 100 operates to separate the high quality Anthracite slurry 90 from the media water 120 drawn from an intake 112 of the cyclone separator 100 through a transfer line 122 for recycling to the raw feed sump 12 with about 90% return of the media water 120. According to this preferred embodiment of the present invention, the above-described process will operate efficiently in a continuous manner to separate carbon of different qualities from refuse provided certain process conditions are observed. For instance, for Anthracite coal it is important that the specific gravity of the water is measured through the water storage source. For Anthracite coal having a specific gravity of about 1.75, the density of the water should be maintained in a range of about 1.35 and 1.45 specific gravity.

The specific gravity of the medium tends to increase after the process has been operating in the steady state for a period of time. In order to control the specific gravity of the medium within the desired range upstream of the first cyclone separator, the recirculating media is constantly monitored with a density gauge so that appropriate action can be taken to maintain the specific gravity within the desired range. For instance, if the specific gravity should increase beyond the desired limit, it can be reduced by bleeding media water out of the system and adding fresh water. If the specific gravity should drop below the desired lower level, it can be increased by increasing the particulate matter in the crushed Anthracite material make up.

In a preferred embodiment, the feedstock slurry is supplied at a static pressure in a range of about 10 psi to about 20 psi at a volumetric flow rate in a range of about 2,000 gpm.

The process disclosed herein is directed to separating Anthracite coal and a low quality carbon from refuse. Since Anthracite coal separation is known to be more difficult than Bituminous coal separation, the process should be effective on Bituminous coal. While some adjustments in operating conditions will have to be made to compensate for the different specific gravity of bituminous coal, such adjustments should be apparent to those skilled in the art in light of the present disclosure.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A process for separating Anthracite from refuse comprising the steps of:

crushing Anthracite coal refuse into an approximate size less than ⅜"×0;

admixing the crushed Anthracite coal refuse with water in a raw feed sump into an admixture;

transferring the admixture to a first cyclone separator having a substantially cylindrical chamber further defined by an upper section of a first diameter, a middle section having a second diameter greater than said first diameter reducing the speed of the admixture rotation, and a conical shaped lower section diminishing in diameter from said middle section, said first cyclone separator constructed and arranged to divide said admixture into a refuse rich slurry stream of about 80 Ash content to be discharged from a first apex positioned at the bottom of said lower section and a carbonaceous rich slurry stream drawn from an outlet positioned at said second diameter;

directing said refuse rich slurry stream through a vibrating screen, said vibrating screen dewatering said refuse rich slurry stream and directing water collected from said dewatering step to said raw feed sump;

transferring said carbonaceous rich slurry drawn from said outlet positioned at said second diameter of said middle section of said first cyclone separator to a second cyclone separator constructed and arranged to separate low quality carbon of about 45 Ash content from a high quality Anthracite slurry;

collecting the low quality carbon from a lower section of said second cyclone separator;

transferring the high quality Anthracite slurry drawn from an intake positioned at an upper section of said second cyclone separator to a third cyclone separator constructed and arranged to separate media from high quality Anthracite slurry of about 12 Ash content;

returning water separated from the high quality Anthracite slurry drawn from an intake positioned where an upper section defined by a uniform diameter meets a lower section defined by a diminishing diameter of said third cyclone separator to said raw feed sump; and collecting the high quality Anthracite from a lower section of said third cyclone separator.

2. The process according to claim 1 including the step of monitoring said water to maintain a density between a range of 1.35 and 1.45 specific gravity.

3. The process according to claim 2 wherein fresh water is added to said raw water feed sump to maintain said specific gravity range.

4. The process according to claim 2 wherein water exceeding said specific gravity range is directed to a vacuum press for clarification and the clarified water directed to said raw feed sump.

5. The process according to claim 2 wherein water exceeding said specific gravity is directed to a centrifuge to be clarified and the clarified water returned to said raw feed sump.

6. The process according to claim 2 wherein water exceeding said specific gravity range is directed to a tailing pond.

7. The process according to claim 1 wherein feedstock slurry is introduced into said upper section of said first cyclone separator.

8. The process according to claim 1 wherein said second cyclone separator has a substantially cylindrical chamber having an upper section of a first diameter, a middle section having a second diameter equal to said first diameter, and a conical shaped lower section diminishing in diameter from said second section to expel low quality Anthracite.

9. The process according to claim 1 wherein said third cyclone separator has a substantially cylindrical chamber having an upper section of a first diameter and a conical shaped lower section diminishing in diameter to an outlet for discharge of high quality Anthracite.

10. The process according to claim 1 wherein said first cyclone separator middle section includes an axial extent greater than said first section for imparting tangentially-admitted feedstock slurry, a reduction in acceleration followed immediately by increasing acceleration in a depending lower section conical portion.

11. The process according to claim 7 wherein said feedstock slurry is supplied at a static pressure in a range of about 10 psi to about 20 psi at a volumetric flow rate in a range of about 2,000 gpm.

12. The process according to claim 1 wherein said process is use for concentrating rare earth elements.

* * * * *